United States Patent
Lin et al.

(10) Patent No.: US 10,125,802 B2
(45) Date of Patent: Nov. 13, 2018

(54) BEARING CABLE STRUCTURE WHILE FABRICATING PANEL

(71) Applicants: Chu-Yu Lin, Taichung (TW);
 Yen-Chen Lin, Taichung (TW)

(72) Inventors: Chu-Yu Lin, Taichung (TW);
 Yen-Chen Lin, Taichung (TW)

(73) Assignees: Chu-Yu Lin, Taichung (TW);
 Yen-Chen Lin, Taichung (TW)

( * ) Notice: Subject to any disclaimer, the term of this patent is extended or adjusted under 35 U.S.C. 154(b) by 147 days.

(21) Appl. No.: 15/448,622

(22) Filed: Mar. 3, 2017

(65) Prior Publication Data
 US 2018/0252247 A1 Sep. 6, 2018

(51) Int. Cl.
 *F16B 7/18* (2006.01)
 *F16B 19/04* (2006.01)

(52) U.S. Cl.
 CPC .............. *F16B 7/18* (2013.01); *F16B 19/04* (2013.01)

(58) Field of Classification Search
 CPC ........ F16B 5/0275; F16B 5/0283; F16B 7/18; F16B 19/04; F16B 35/042
 USPC ................................................. 411/388, 389
 See application file for complete search history.

(56) References Cited

U.S. PATENT DOCUMENTS

| | | | | | |
|---|---|---|---|---|---|
| 1,985,806 | A * | 12/1934 | Wolfe | ...................... | B60M 5/00 238/14.05 |
| 2,287,135 | A * | 6/1942 | Robertson | ............ | H04B 15/025 123/633 |
| 3,404,504 | A * | 10/1968 | Taylor | ................... | E21D 21/008 52/711 |
| 3,780,774 | A * | 12/1973 | Daniel | ................. | D03C 9/0683 139/87 |
| 4,613,199 | A * | 9/1986 | McGeary | ............. | H01R 9/0518 439/585 |
| 5,813,185 | A * | 9/1998 | Jackson | .................... | E04C 5/16 411/427 |
| 6,311,564 | B1 * | 11/2001 | Martin | ..................... | G01B 7/18 73/787 |
| 8,690,484 | B2 * | 4/2014 | Oldsen | .................. | E21D 20/028 405/259.1 |
| 8,702,362 | B2 * | 4/2014 | Zhu | ........................... | F16B 7/18 411/166 |
| 8,931,789 | B2 * | 1/2015 | Poloni | ....................... | C21C 5/50 280/93.51 |

* cited by examiner

*Primary Examiner* — Roberta S Delisle

(57) ABSTRACT

A bearing cable structure while fabricating panel comprises a steel cable and two sets of fixing members. Each connection section of the steel cable is assembled to the corresponding antiskid ring and then assembled into the axial blind hole of each fixing member and further riveted to the screwing section of each fixing member by machine so that the fixing members are tightly connected to the outer layer of the steel cable and the steel cable and the fixing members are integrated with each other for preventing from falling off, and simultaneously the riveting of the axial blind hole may engage with the outer layer to perform double location so as to strengthen an axial pull strength of the bearing cable structure and increase service life.

6 Claims, 3 Drawing Sheets

BEARING CABLE STRUCTURE WHILE FABRICATING PANEL

FIELD OF THE INVENTION

The present invention relates to a bearing cable structure while fabricating panel, and more particularly to a bearing cable structure capable of transversely pulling the panel while fabricating to make its structure better and strengthen the axial pull strength so as to prevent from shifting or sliding.

BACKGROUND OF THE INVENTION

The conventional panel supporting structure may refer to Taiwanese Patent No. 1251573. It disclosed a substrate support member for conveying a linear substrate storage rack. A rectangular frame is formed by a pair of pillars and plural coupling beams which are spaced apart and arranged therebetween in a longitudinal direction of the rectangular frame. And an oblong frame is formed by plural coupling beams adjacent to the rectangular frame in a depth direction of the rectangular frame. In addition, in the rectangular frame between the pair of uprights to be spaced apart linear plural substrate support member disposed in the height direction at the same time, in said adjacent rectangular frame, formed as the linear substrate support member facing sheets set to the same height and the horizontal. Characterized in that squeezing the resin-coated stainless steel strip in a plurality of metal wires stranded stainless steel wire forms linear outer periphery and fixed to the mounting hardware, mounting hardware above, it is that both sides, both ends of the linear resin portion after removing the body exposed to the outside of the linear stainless steel crimped both ends fixed to the linear portion pair and the end portion of the resin is exposed stainless steel lines adjacent steel wire.

However, the above mentioned support member is mainly used mounting hardware to directly cover the stainless steel wire. The hardware and the stainless steel wire are pressed to connect with each other by machine. Therefore, the support member formed by above mentioned manners may make the stainless steel wire easily abrade and be unstable. The reason is that the mounting hardware and the stainless steel wire are made of metal so that the support member may abrade to others. For a long time, the mounting hardware may be fallen off from the stainless steel wire to influence the panel fabrication process.

SUMMARY OF THE INVENTION

An objective of this invention is providing a bearing cable structure while fabricating panel. It may comprise a steel cable, an outer layer made by resin covers the steel cable, two connection sections are respectively formed at two ends of the steel cable which are not covered by the outer layer, an antiskid ring covers each of the two connection sections for fastening, and a diameter of the antiskid ring is larger than a diameter of the outer layer; and two sets of fixing members, a screwing section is arranged at an outer edge of each fixing member, and an axial blind hole is formed inwardly at one end of the screwing section; wherein each connection section of the steel cable is assembled to the corresponding antiskid ring and then assembled into the axial blind hole of each fixing member and further riveted to the screwing section by machine so that the fixing members are tightly connected to the outer layer of the steel cable and the steel cable and the fixing members are integrated with each other for preventing from falling off, and simultaneously the riveting of the axial blind hole of each fixing member may engage with the outer layer of the steel cable to perform double location so as to strengthen an axial pull strength of the bearing cable structure and increase service life.

The above mentioned bearing cable structure may have the advantage described as follows. The arrangement of the antiskid ring may prevent the steel cable from directly contacting with the fixing members to result in abrasion. In addition, the antiskid ring is riveted and limited by the axial blind hole and further it may strengthen the axial pull strength. Therefore, the panel which is borne on the bearing cable structure may be not easy in unstable condition, such as shifting or sliding.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
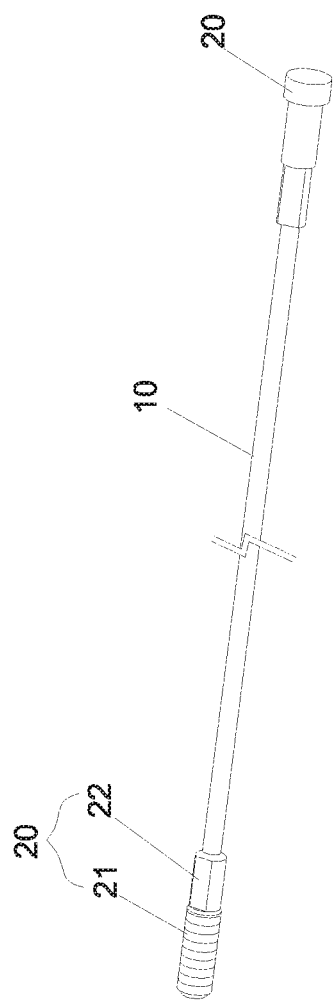
FIG. 1 is a structural drawing of a bearing cable structure while fabricating panel according to the present invention.

Referring now to the drawings where like characteristics and features among the various figures are denoted by like reference characters.

Figure 2:
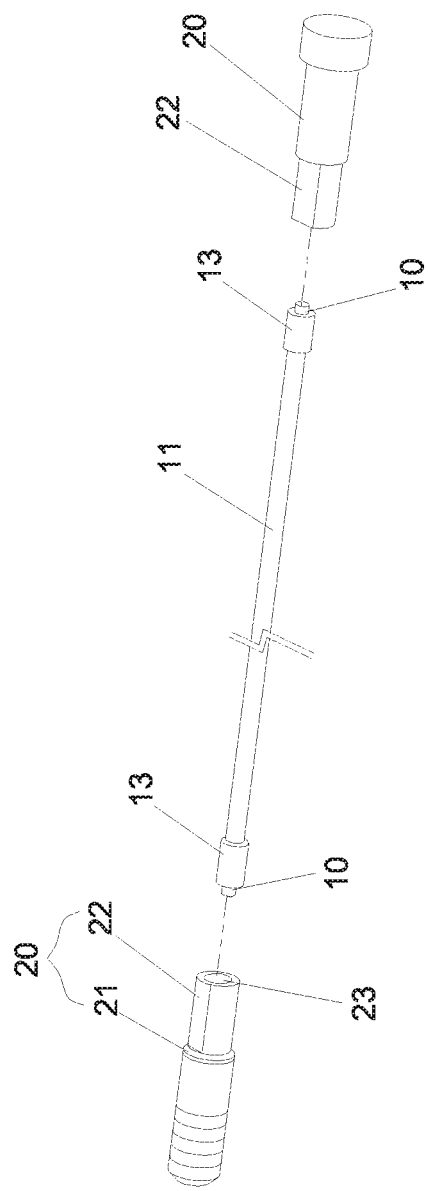
FIG. 2 is an exploded view of the bearing cable structure while fabricating panel according to the present invention.
Figure 3:
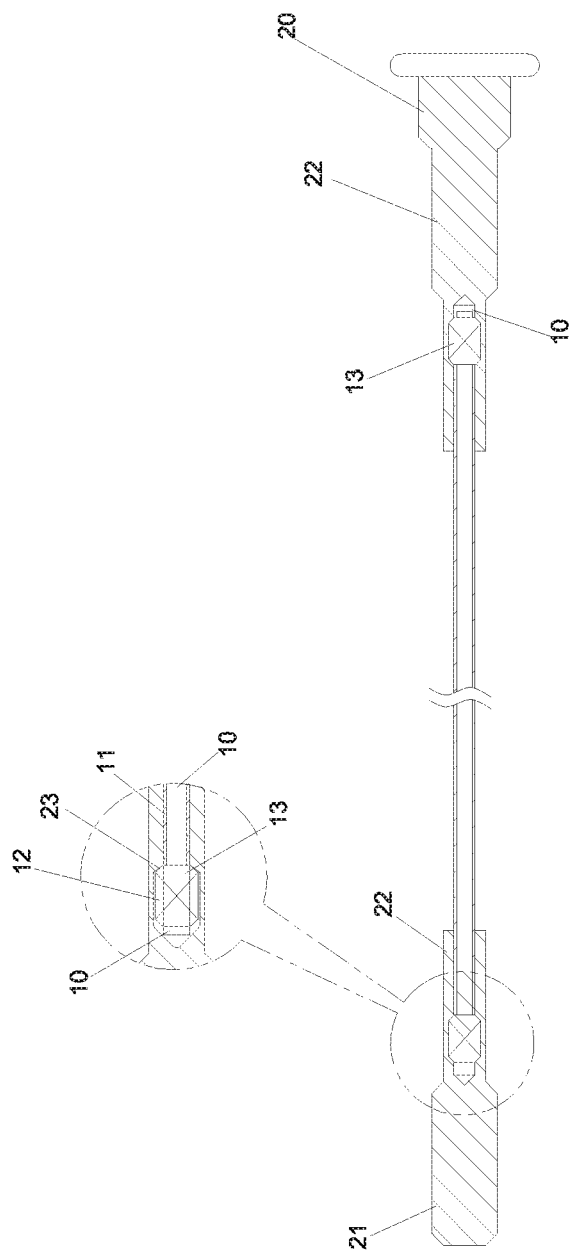
FIG. 3 is a cross-sectional view of the bearing cable structure while fabricating panel according to the present invention.

Please refer to FIGS. 1 to 3, the bearing cable structure while fabricating panel of this invention may comprise a steel cable 10 and two sets of fixing members 20.

An outer layer 11 made by resin covers the steel cable 10.

Two connection sections 12 are respectively formed at two ends of the steel cable 10 which are not covered by the outer layer 11. An antiskid ring 13 covers each of the two connection sections 12 for fastening. A diameter of the antiskid ring 13 is larger than a diameter of the outer layer 11. Selectively, the steel cable 10 may be composed of a plurality of steel wires which are winded around one another to form a double-axis structure or a single-axis structure.

A screwing section 22 is arranged at an outer edge of each fixing member 20 and an axial blind hole 23 is formed inwardly at one end of the screwing section 22. Each fixing member 20 further has an outer threading section 21.

Each connection section 12 of the steel cable 10 is assembled to the corresponding antiskid ring 13 and then assembled into the axial blind hole 23 of each fixing member 20 and further riveted to the screwing section 22 by machine so that the fixing members 20 are tightly connected to the outer layer 11 of the steel cable 10 and the steel cable 10 and the fixing members 20 are integrated with each other for preventing from falling off. Simultaneously, the riveting of the axial blind hole 23 of each fixing member 20 may engage with the outer layer 11 of the steel cable 10 to perform double location so as to strengthen an axial pull strength of the bearing cable structure and increase service life.

Please refer to FIGS. 1 to 3, the bearing cable structure of the present invention is assembled onto a frame of a bearing panel by using the outer threading section 21 to screw to the frame. Since the antiskid ring 12 is assembled to the steel cable 10 which is limited by the axial blind hole 23 of each fixing member 20 and the axial blind hole 23 is engaged with the outer layer 11 to perform double location, it may provide the steel cable 10 to strengthen the axial pull strength and to reset the steel cable 10 at the same time. The panel while processing may be not in unstable condition, such as shifting or sliding. Besides the arrangement of the outer threading section 21 of each fixing member 20, it may be integrated with the steel cable 10 by riveting with a rotatable and smooth handle.

Furthermore, a hexagonal structure is formed by a tool after the antiskid rings 13 cover the steel cable 10 and a tetragonal structure is formed by riveting while the fixing members 20 are connected with the steel cable 10. The hexagonal structure and the tetragonal structure may limit their own positions to strengthen the axial pull strength while each antiskid ring 13 of the steel cable 10 is fixed in the corresponding fixing member 20.

Compared to the Taiwanese Patent No. 1251573, the axial blind hole 23 of the bearing cable structure of the present invention is the hole with a single diameter so as to easily be machined.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed is:

1. A bearing cable structure while fabricating panel, comprising:
   a steel cable, an outer layer made by resin covers the steel cable, two connection sections are respectively formed at two ends of the steel cable which are not covered by the outer layer, an antiskid ring covers each of the two connection sections for fastening, and a diameter of the antiskid ring is larger than a diameter of the outer layer; and
   two sets of fixing members, a screwing section is arranged at an outer edge of each fixing member, and an axial blind hole is formed inwardly at one end of the screwing section;
   wherein each connection section of the steel cable is assembled to the corresponding antiskid ring and then assembled into the axial blind hole of each fixing member and further riveted to the screwing section by machine so that the fixing members are tightly connected to the outer layer of the steel cable and the steel cable and the fixing members are integrated with each other for preventing from falling off, and simultaneously the riveting of the axial blind hole of each fixing member may engage with the outer layer of the steel cable to perform double location so as to strengthen an axial pull strength of the bearing cable structure and increase service life.

2. The bearing cable structure as claimed in claim 1, wherein the steel cable is composed of a plurality of steel wires which are winded around one another to form a double-axis structure.

3. The bearing cable structure as claimed in claim 1, wherein the steel cable is a single-axis structure.

4. The bearing cable structure as claimed in claim 1, wherein a hexagonal structure is formed by a tool after the antiskid rings cover the steel cable and a tetragonal structure is formed by riveting while the fixing members are connected with the steel cable, the hexagonal structure and the tetragonal structure limit their own positions to strengthen the axial pull strength while each antiskid ring of the steel cable is fixed in the corresponding fixing member.

5. The bearing cable structure as claimed in claim 1, wherein the axial blind hole is a hole with a single diameter.

6. The bearing cable structure as claimed in claim 1, wherein each fixing member has an outer threading section.

* * * * *